United States Patent
Jade et al.

(10) Patent No.: US 9,376,979 B2
(45) Date of Patent: Jun. 28, 2016

(54) FUEL GOVERNOR FOR CONTROLLED AUTOIGNITION ENGINES

(71) Applicant: Robert Bosch GmbH, Stuttgart (DE)

(72) Inventors: Shyam Jade, Ann Arbor, MI (US); Erik Hellstrom, Ann Arbor, MI (US); Anna Stefanopoulou, Ann Arbor, MI (US); Li Jiang, Ann Arbor, MI (US)

(73) Assignees: Robert Bosch GmbH, Stuttgart (DE); The Regents of the University of Michigan, Ann Arbor, MI (US)

( * ) Notice: Subject to any disclaimer, the term of this patent is extended or adjusted under 35 U.S.C. 154(b) by 779 days.

(21) Appl. No.: 13/621,425

(22) Filed: Sep. 17, 2012

(65) Prior Publication Data
US 2013/0090837 A1    Apr. 11, 2013

Related U.S. Application Data (60) Provisional application No. 61/543,544, filed on Oct. 5, 2011.

(51) Int. Cl.
*F02D 41/24*    (2006.01)
*F02D 41/14*    (2006.01)
(Continued)

(52) U.S. Cl.
CPC .......... *F02D 41/2451* (2013.01); *F02D 35/023* (2013.01); *F02D 35/028* (2013.01); *F02D 41/3035* (2013.01); *F02D 41/40* (2013.01);
(Continued)

(58) Field of Classification Search
CPC . F02D 41/2451; F02D 41/3035; F02D 41/40; F02D 35/028; F02D 35/023; F02D 2041/1416; F02D 2041/1412; F02D 2041/1423; F02D 41/2464; F02D 2041/141; Y02T 10/44; Y02T 10/128
USPC .......... 701/102–105, 111; 123/90.15
See application file for complete search history.

(56) References Cited

U.S. PATENT DOCUMENTS

| 5,094,213 A | * | 3/1992 | Dudek | F02D 37/00 123/339.27 |
| 6,082,342 A | | 7/2000 | Duret et al. | |

(Continued)

FOREIGN PATENT DOCUMENTS

JP    2008291718    12/2008

OTHER PUBLICATIONS

Ravi et al., "Mid-ranging control of a multi-cylinder HCCI engine using split fuel injection and valve timings," Sixth IFAC Symposium on Advances in Automotive Control, 2010.
(Continued)

*Primary Examiner* — Stephen K Cronin
*Assistant Examiner* — Brian Kirby
(74) *Attorney, Agent, or Firm* — Michael Best & Friedrich LLP (57) ABSTRACT

Methods and systems for controlling combustion performance of an engine are provided. A desired fuel quantity for a first combustion cycle is determined. One or more engine actuator settings are identified that would be required during a subsequent combustion cycle to cause the engine to approach a target combustion phasing. If the identified actuator settings are within a defined acceptable operating range, the desired fuel quantity is injected during the first combustion cycle. If not, an attenuated fuel quantity is determined and the attenuated fuel quantity is injected during the first combustion cycle.

18 Claims, 6 Drawing Sheets

(51) Int. Cl.
*F02D 41/30* (2006.01)
*F02D 41/40* (2006.01)
*F02D 35/02* (2006.01)

(52) U.S. Cl.
CPC ....... *F02D 41/2464* (2013.01); *F02D 2041/141* (2013.01); *F02D 2041/1412* (2013.01); *F02D 2041/1416* (2013.01); *Y02T 10/128* (2013.01); *Y02T 10/44* (2013.01)

(56) References Cited

U.S. PATENT DOCUMENTS

| | | | | |
|---|---|---|---|---|
| 6,230,683 | B1 | 5/2001 | zur Loye et al. | |
| 6,276,334 | B1 | 8/2001 | Flynn et al. | |
| 6,480,782 | B2 * | 11/2002 | Brackney | F02D 41/0052 123/568.21 |
| 6,953,024 | B2 * | 10/2005 | Linna | F02B 1/12 123/406.24 |
| 6,994,072 | B2 | 2/2006 | Kuo et al. | |
| 7,072,758 | B2 | 7/2006 | Kolmanovsky et al. | |
| 7,128,047 | B2 | 10/2006 | Kuo et al. | |
| 7,210,457 | B2 * | 5/2007 | Kuzuyama | F02D 37/02 123/305 |
| 7,228,839 | B2 | 6/2007 | Kuo et al. | |
| 7,275,374 | B2 * | 10/2007 | Stewart | F02D 23/00 123/299 |
| 7,337,762 | B2 * | 3/2008 | Eng | F01L 1/34 123/295 |
| 7,369,934 | B2 * | 5/2008 | Chatfield | F02D 11/105 123/480 |
| 7,739,999 | B2 * | 6/2010 | Kang | F02D 13/0265 123/299 |
| 7,878,048 | B2 * | 2/2011 | Wang | F02D 35/023 73/114.27 |
| 7,899,601 | B2 | 3/2011 | Yun et al. | |
| 8,061,318 | B2 * | 11/2011 | Cleary | F02D 13/0207 123/90.15 |
| 8,103,425 | B2 * | 1/2012 | Choi | F02D 35/023 123/435 |
| 8,437,945 | B2 * | 5/2013 | Haskara | F02D 35/023 123/299 |
| 2003/0125865 | A1 * | 7/2003 | Yasui | F02D 41/0235 701/109 |
| 2006/0112680 | A1 * | 6/2006 | Beer | F01N 3/2006 60/284 |
| 2006/0196468 | A1 * | 9/2006 | Chang | F02D 13/0219 123/305 |
| 2007/0089697 | A1 * | 4/2007 | Hara | F02D 35/023 123/90.15 |
| 2007/0119417 | A1 * | 5/2007 | Eng | F01L 1/34 123/305 |
| 2007/0162216 | A1 * | 7/2007 | Choi | F02D 35/023 701/103 |
| 2007/0215095 | A1 | 9/2007 | Kakuya et al. | |
| 2007/0272203 | A1 * | 11/2007 | Sloane | F02B 17/005 123/295 |
| 2009/0101094 | A1 * | 4/2009 | Mashiki | F01L 1/352 123/90.17 |
| 2009/0254263 | A1 | 10/2009 | Shimizu | |
| 2010/0031924 | A1 | 2/2010 | Sun et al. | |
| 2010/0162991 | A1 * | 7/2010 | Ramappan | F02B 1/02 123/27 R |
| 2011/0005491 | A1 | 1/2011 | Terada et al. | |
| 2011/0016850 | A1 | 1/2011 | Shibata et al. | |
| 2011/0137541 | A1 | 6/2011 | Malikopoulos | |

OTHER PUBLICATIONS

Allison et al., "Design and performance of mid-ranging controllers," Journal of Process Control, vol. 8, Nos. 5-6, pp. 469-474, Dec. 1998.
Vahidi et al., "Constraint handling in a fuel cell system: a fast reference governor approach," Proceedings of the 2005 American Control Conference, vol. 6, pp. 3865-3870, 2005.
Jade et al., "Fuel governor augmented control of recompression HCCI combustion during large load transients," Submitted to 2012 American Control Conference, Jun. 27-29, Montreal, Canada.
Jade et al., "Fuel governor augmented control of recompression HCCI combustion during large load transients," Preprint submitted to 2012 American Control Conference, Received Sep. 25, 2011.
U.S. Appl. No. 13/621,539, filed Sep. 17, 2012.
U.S. Appl. No. 13/621,527, filed Sep. 17, 2012.
U.S. Appl. No. 13/621,433, filed Sep. 17, 2012.
United States Patent Office Action for U.S. Appl. No. 13/621,433 dated Jul. 2, 2015 (8 pages).

* cited by examiner

FUEL GOVERNOR FOR CONTROLLED AUTOIGNITION ENGINES

CROSS-REFERENCE TO RELATED APPLICATIONS

This application claims priority to U.S. Provisional Application No. 61/543,544, filed Oct. 5, 2011, and titled "FUELING STRATEGY FOR CONTROLLED-AUTOIGNITION ENGINES," the entirety of which is incorporated herein by reference.

STATEMENT REGARDING FEDERALLY SPONSORED RESEARCH OR DEVELOPMENT

This invention was made with Government support under grant No. DE-EE0003533 awarded by the Department of Energy. The Government has certain rights in this invention.

BACKGROUND

Embodiments of the present invention relate to real-time engine control during recompression homogeneous charge compression ignition ("HCCI") combustion.

SUMMARY

In one embodiment, the invention provides a method for controlling combustion performance of an engine. The method includes determining a desired fuel quantity for a first combustion cycle. One or more engine actuator settings are then identified which would be required during a subsequent combustion cycle to cause the engine to approach a target combustion phasing. If the identified engine actuator settings are within a defined acceptable operating range, the desired fuel quantity is injected during the first combustion cycle. If not, an attenuated fuel quantity is determined and the attenuated fuel quantity is injected during the first combustion cycle.

In some embodiments, the attenuated fuel quantity is determined by identifying the actuator settings necessary to cause the engine to approach the target combustion phasing if the desired fuel quantity is injected and then comparing the necessary actuator settings to the acceptable operating range.

In other embodiments, the method further includes determining a maximum fuel injection amount and a minimum fuel injection amount. The maximum fuel injection amount is the maximum amount of fuel that can be injected without requiring one or more engine actuator settings that are outside of the defined acceptable operating range. The minimum fuel injection amount is the minimum amount of fuel that can be injected without requiring one or more engine actuator settings that are outside of the defined acceptable operating range. If the desired fuel quantity is greater than the maximum fuel injection amount, the value of the attenuated fuel quantity is defined as the maximum fuel injection amount. If the desired fuel quantity is less than the minimum fuel injection amount, the value of the attenuated fuel quantity is defined as the minimum fuel injection amount.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Internal combustion engines can be configured to operate in one or more of various combustion modes—the most well known of which is spark ignition. However, some engines are configured to operate in autoignition mode where combustion is achieved by compressing the in-cylinder gas to the point of selfignition instead of introducing a spark. In the examples described below, the internal combustion engine can selectively switch between a spark ignition mode and an autoignition (or homogeneous charge compression ignition (HCCI)) mode. In other examples, an internal combustion engine can be configured to operate in additional or other combustion modes.

Figure 1:
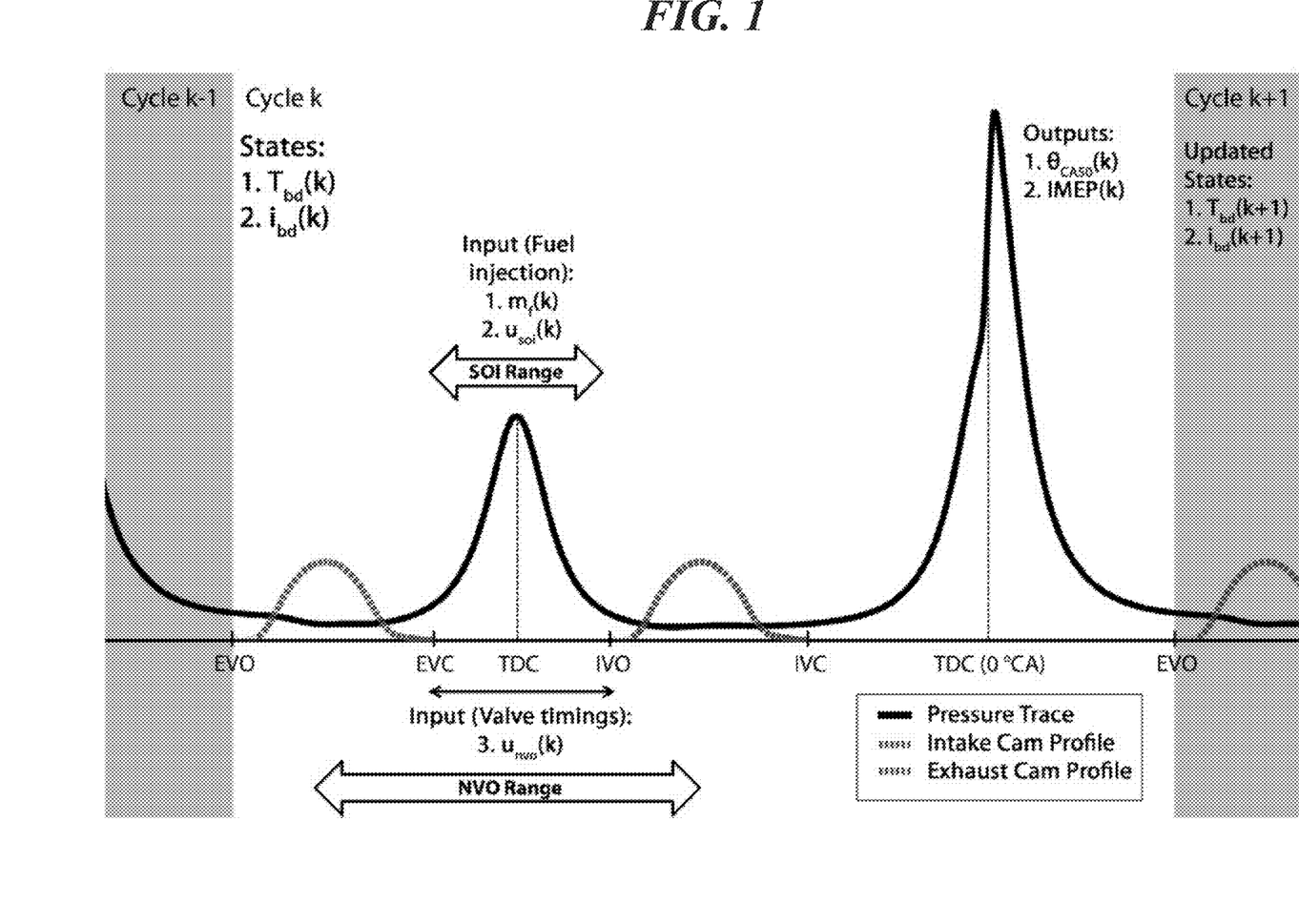
FIG. 1 is a graph illustrating recompression HCCI combustion for an internal combustion engine as a function of time.

FIG. 1 illustrates the operation of a single cylinder of an internal combustion engine during autoignition combustion (otherwise known as homogeneous charge compression ignition). The solid black line represents the pressure inside the engine cylinder. The position of the exhaust valve is indicated by the dotted line extending from EVO ("exhaust valve opening") to EVC ("exhaust valve closing"). Similarly, the position of the intake valve is indicated by the dotted line extending from IVO ("intake valve opening") to IVC ("intake valve closing"). The valve timing (i.e., the opening and closing times of the intake and exhaust valves) is configured to achieve a negative valve overlap (NVO) which traps large amounts of hot residual gas and, ultimately, helps cause combustion within the cylinder. FIG. 1 illustrates one complete combustion cycle for the cylinder (Cycle k). FIG. 1 also illustrates part of the previous combustion cycle (Cycle k−1) and the subsequent combustion cycle (Cycle k+1).

As illustrated in FIG. 1, fuel is injected into the cylinder during the negative valve overlap range (i.e., after the exhaust valve closes, but before the intake valve opens). The pressure inside the cylinder also increases during the negative valve overlap range (i.e., the first area of increased pressure illustrated in FIG. 1). After the intake valve is closed, but before the exhaust valve is opened, the pressure in the cylinder again increases. When the pressure and heat in the cylinder are sufficient the fuel-air mixture in the cylinder ignites, further increasing the pressure within the cylinder and forcing the piston downwards. As the gas expands, the piston moves downwards, and the exhaust valve is opened (EVO) to begin the next combustion cycle.

Figure 2:
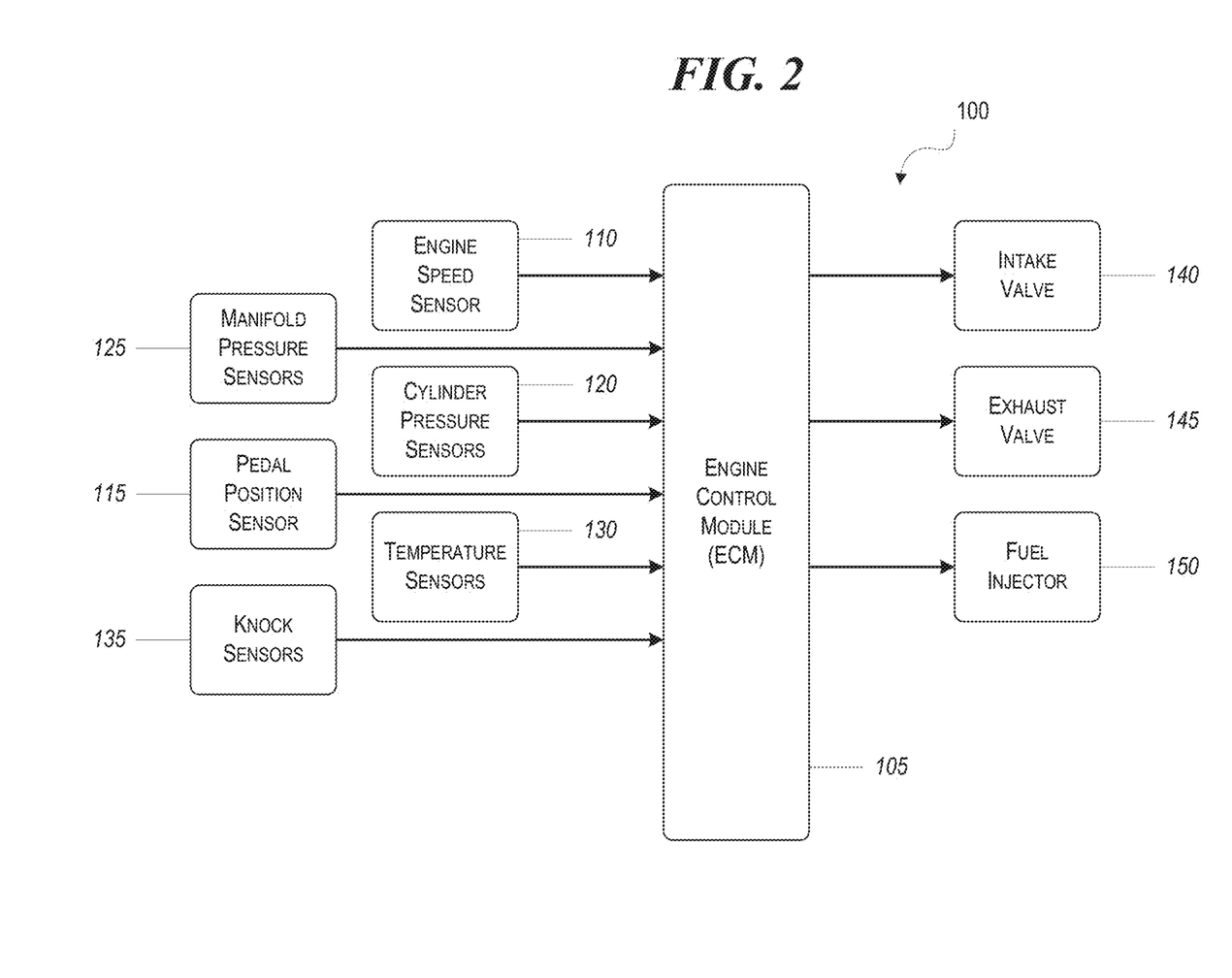
FIG. 2 is a block diagram of a HCCI engine control system.

FIG. 2 illustrates a real-time engine control system 100 that, among other things, monitors and controls the operation of an internal combustion engine during recompression homogeneous charge compression ignition ("HCCI") combustion. The engine control system 100 includes an engine control module 105 implemented on a vehicle equipped with a plurality of engine sensors and engine control actuators. The sensors include, for example, an engine speed sensor 110, a pedal position sensor 115, cylinder pressure sensors 120, manifold pressure sensors 125 (i.e., intake manifold, temperature or pressure), temperature sensors 130 (i.e., cooling temperature sensor), knock sensors 135, and other engine sensors. The actuators include, for example, the intake valve 140, the exhaust valve 145, and the fuel injector 150. The fuel injector 150 injects fuel into a cylinder of the internal combustion engine of the vehicle according to an injection timing value (e.g., start of fuel injection ($u_{soi}$)) and an injection quantity value (e.g., fuel injection amount ($m_f$)) determined by the engine control module as described in further detail below.

The ECM 105 monitors the various sensors 110, 115, 120, 125, 130, 135 and controls the actuators 140, 145, 150. The ECM 105 receives information (i.e., data captured by the sensors) and processes the received information to control the combustion performance of the engine such that a target combustion phasing ($\theta_{CA50}^{ref}(k)$) and a target fuel injection amount ($m_f^{des}(k)$) are achieved, and predetermined constraint requirements are satisfied. The ECM 105 includes at least one processor and at least one memory module 155, shown in FIG. 3. The memory module 155 stores data (e.g., target values of combustion phasing ($\theta_{CA50}^{ref}(k)$) and fuel injection timing ($u_{soi}^{ref}(k)$)) and instructions that are executed by the processor to provide the functionality of the ECM 105.

Figure 3:
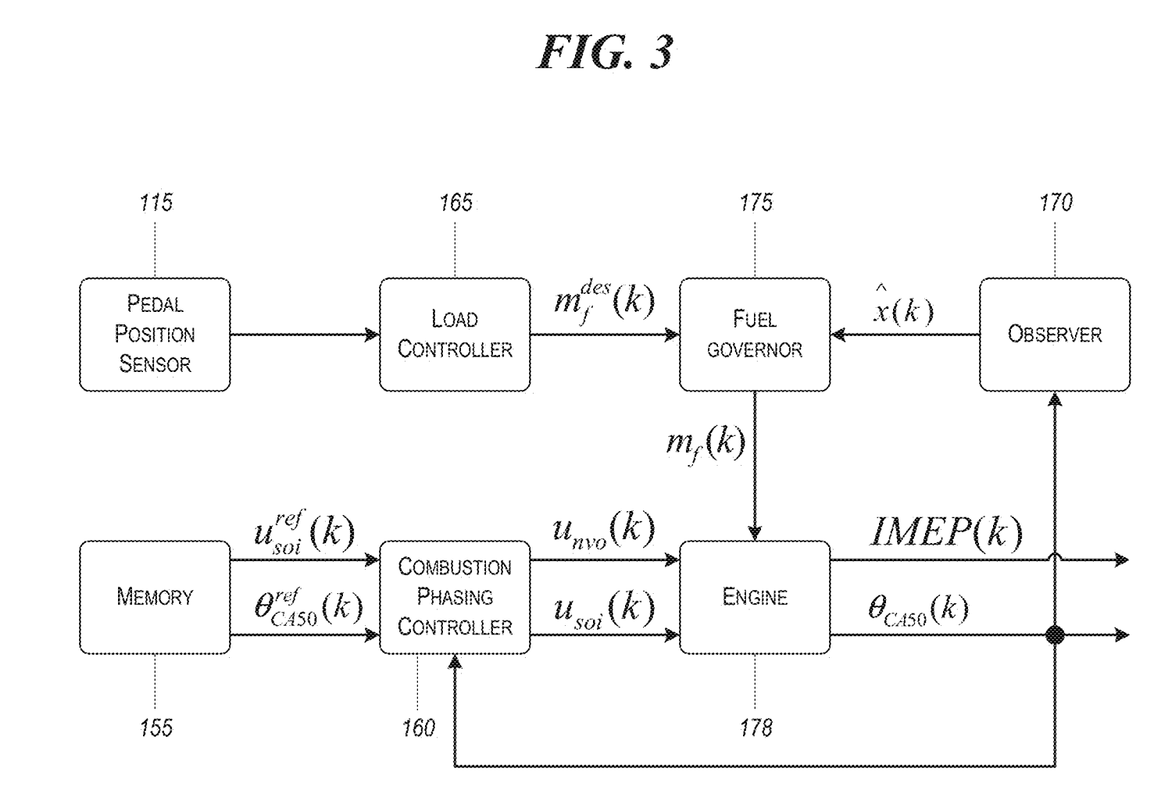
FIG. 3 is a schematic flowchart illustrating the flow of information during the operation of the HCCI engine control system of FIG. 2.

FIG. 3 illustrates the operation of a real-time HCCI engine control system 100 such as the one illustrated in FIG. 2. The HCCI engine control system of FIG. 3 includes the memory module 155, the combustion phasing controller 160, the load controller 165, the observer 170, the fuel governor 175, and the pedal position sensor 115 of the engine 178 equipped with the various sensors and actuators as described above in reference to FIG. 2. The combustion phasing controller 160 receives and processes the target values of combustion phasing ($\theta_{CA50}^{ref}(k)$) and fuel injection timing ($u_{soi}^{ref}(k)$) stored in the memory module 155. The combustion phasing controller 160 also receives a combustion phasing ($\theta_{CA50}(k)$) value based on information received from the engine sensors. Based on the received values, the combustion phasing controller 160 regulates actuator settings to cause the combustion phasing ($\theta_{CA50}(k)$) to approach the target combustion phasing ($\theta_{CA50}^{ref}(k)$). The actuator settings ($u(k)$) include valve actuation timing ($u_{nvo}(k)$) and fuel injection timing ($u_{soi}(k)$), thus $$u = [u_{nvo}, u_{soi}]^T \quad (1)$$

where k is the current combustion cycle.

The observer 170 receives and processes the combustion phasing ($\theta_{CA50}(k)$) of the engine 178 to estimate current combustion state information. The current combustion state information, denoted by ($\hat{x}(k)$), includes a temperature ($T_{bd}(k)$) and a pre-combustion charge composition ($i_{bd}(k)$) associated with at least one cylinder of the engine 178.

$$x_d = [i_{bd}, T_{bd}]^T \quad (2)$$

An output from the pedal position sensor 115 is received and processed by the load controller 165 to determine a target fuel injection amount. In some constructions, this is accomplished by employing a torque correlation model to determine an amount of torque to be exercised based, at least in part, on the pedal position measurements. After applying the torque correlation model, the load controller 165 uses a converter to determine the target fuel injection amount ($m_f^{des}(k)$) based on the determined amount of torque.

The estimated current combustion state information ($\hat{x}(k)$) and the determined target fuel injection amount ($m_f^{des}(k)$) are received and processed by the fuel governor 175 to determine an appropriate amount of fuel to inject ($m_f(k)$) into at least one cylinder of the engine 178. The fuel governor 175 employs a predictive model, described in further detail below, to determine whether the target fuel injection amount ($m_f^{des}(k)$) would require actuator settings ($u(k)$) that violate predetermined constraints in order to cause the combustion phasing ($\theta_{CA50}(k)$) of the engine 178 to approach the target combustion phasing ($\theta_{CA50}^{ref}(k)$). If the target fuel injection amount ($m_f^{des}(k)$) would require actuator settings ($u(k)$) that violate predetermined constraints, the fuel governor 175 adjusts the fuel injection amount ($m_f(k)$), as discussed in more detail below in reference to FIGS. 5 and 6. The adjusted fuel injection amount ($m_f(k)$) is then used as an input to the fuel injector of the engine 178. If the fuel governor 175 predicts that the target fuel injection amount ($m_f^{des}(k)$) would require actuator settings ($u(k)$) that satisfy the predetermined constraints, the target fuel injection amount ($m_f^{des}(k)$) is provided to the fuel injector and injected to the engine cylinder. Under these conditions, the engine is capable of delivering the requested torque while also causing the combustion phasing of the engine to approach the target combustion phasing.

The predetermined constraints, mentioned in the paragraphs above in reference to FIGS. 1-3, may include actuator component constraints, actuator control authority constraints, and combustion performance constraints. In some embodiments, the actuator component constraints may include range and rate limitations for each of the plurality of actuators controlling the valve actuation timing and the fuel injection timing. The valve actuation timing, denoted by $u_{nvo}(k)$, is limited within a range of values and defined by $$u_{nvo}^{min} \leq u_{nvo} \leq u_{nvo}^{max} \quad (3)$$

where $u_{nvo}^{min}$ is the minimum valve actuation timing and $u_{nvo}^{max}$ is the maximum valve actuation timing. The maximum rate for valve actuation timing, denoted by $\Delta u_{nvo}$, is given by $$|u_{nvo}(k) - u_{nvo}(k-1)| < \Delta u_{nvo} \quad (4)$$

where $u_{nvo}(k)$ is the current value of the valve actuation timing and $u_{nvo}(k-1)$ is the previous value of the valve actuation timing. The fuel injection timing, denoted by $u_{soi}(k)$, is also limited within a range of values and defined by $$u_{soi}^{min} \leq u_{soi} \leq u_{soi}^{max} \quad (5)$$

where $u_{soi}^{min}$ is the minimum fuel injection timing and $u_{soi}^{max}$ is the maximum fuel injection timing. The values of minimum and maximum timing and the maximum rate thresholds are constants, which are hardware dependent. Examples of range limitations for actuators controlling valve timing (defining the negative valve overlap period) and the fuel injection timing (defined by the start of injection ("SOI")) and how they correspond to the overall timing of the combustion cycle are partially illustrated in FIG. 1.

Aside from the actuator component constraints, the predetermined constraints may also include the actuator control authority constraints and the combustion performance constraints. In some embodiments, the actuator control authority constraints include a relative magnitude of authority and a bandwidth for each of the plurality of actuators controlling the valve actuation timing ($u_{nvo}(k)$) and the fuel injection timing ($u_{soi}(k)$). Additionally, in some embodiments, the combustion performance constraints include limited pressure rise rates, air-to-fuel ratios, and maximum allowable emissions.

Figure 4:
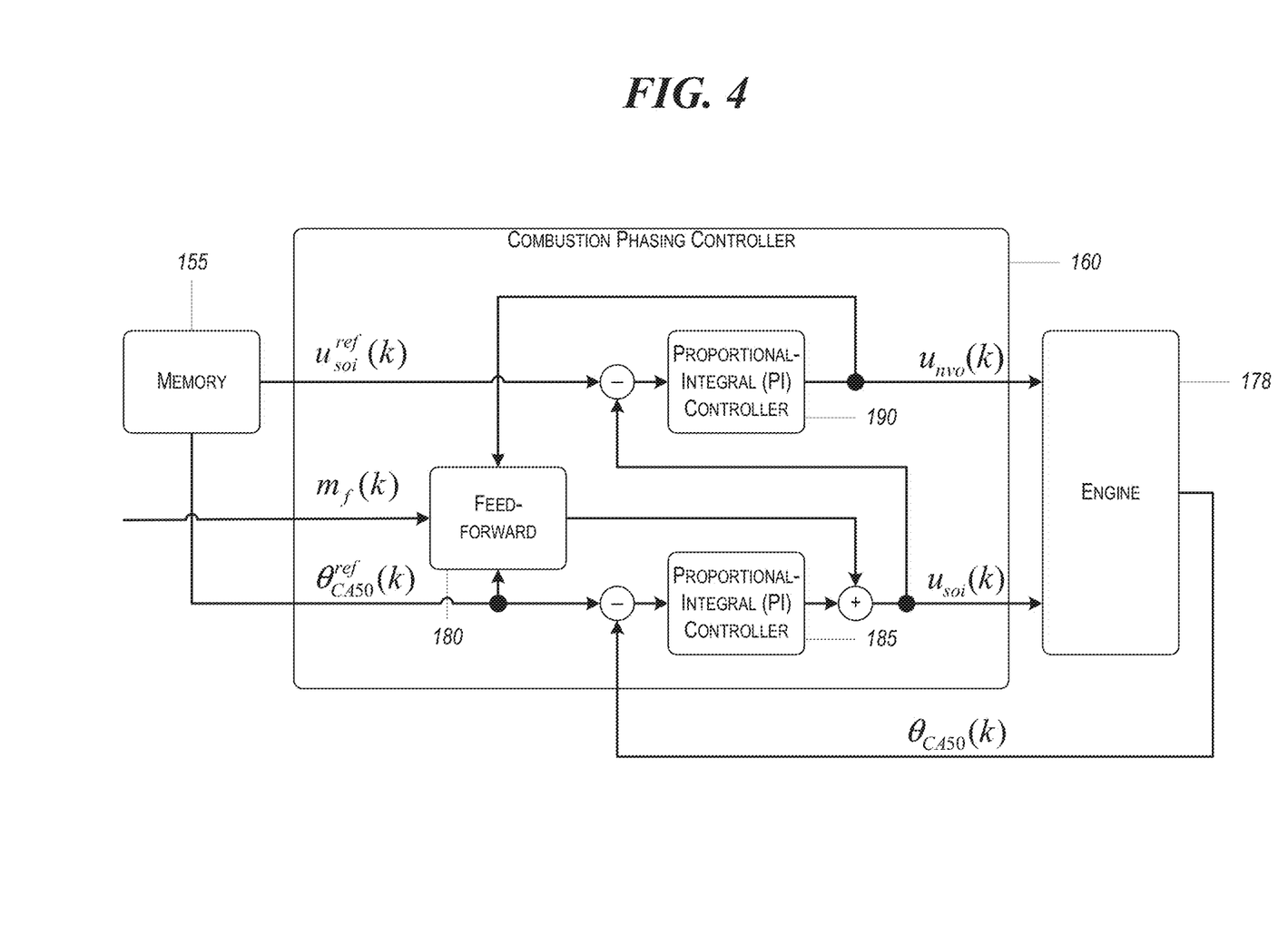
FIG. 4 is a schematic flowchart illustrating the operation of the combustion phasing controller of FIG. 3 in further detail.

FIG. 4 illustrates one implementation of the combustion phasing controller 160 of FIG. 3 including a feed-forward module 180, a proportional-integral ("PI") controller 185, and a second PI controller 190. The combustion phasing controller 160 is configured to receive and process the target values of combustion phasing ($\theta_{CA50}^{ref}(k)$) and fuel injection timing ($u_{soi}^{ref}(k)$), the fuel injection amount ($m_f(k)$), and the combustion phasing ($\theta_{CA50}(k)$) output of the engine 178. The combustion phasing ($\theta_{CA50}(k)$) is defined by $$\theta_{CA50}(k) = g(x_d(k), u(k), m_f(k), x_c(kT_s)) \quad (6)$$

where $x_d(k)$ is the discrete combustion state vector, $u(k)$ is the vector of actuator settings, $m_f(k)$ is the fuel injection amount, $x_c$ is a vector of five continuous manifold states, and $T_s$ is the engine cycle time. Based on the received input values, the combustion phasing controller 160 simultaneously regulates the exhaust valve closing ("EVC") and the fuel injection timing ($u_{soi}(k)$) to control the engine 178 during recompression HCCI combustion such that target combustion phasing ($\theta_{CA50}^{ref}(k)$) is achieved.

Figure 5:
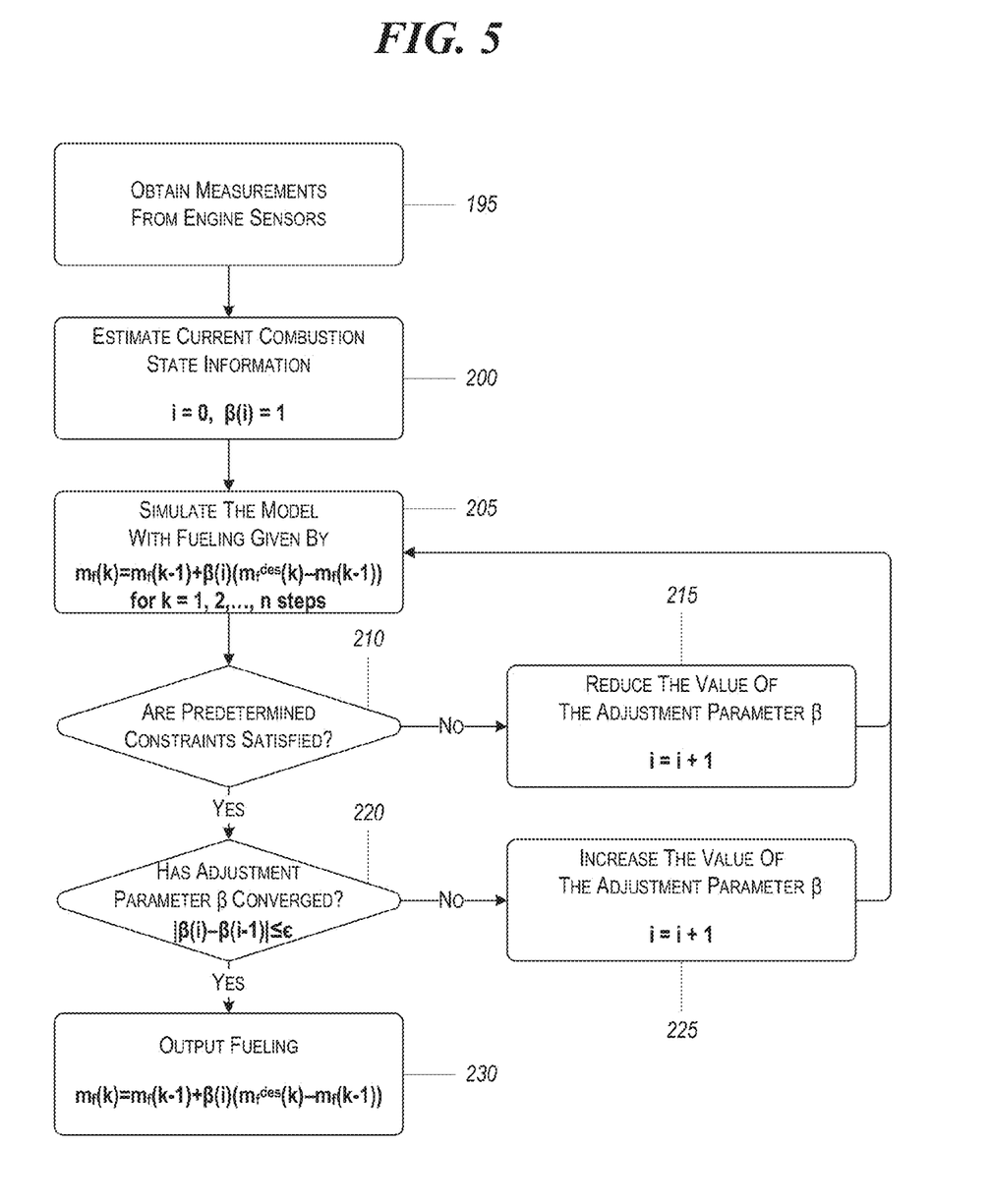
FIG. 5 is a flowchart of a nonlinear method of operating the fuel governor of FIG. 3 to determine a fuel injection amount for an internal combustion engine.

FIG. 5 illustrates a nonlinear approach by which the fuel governor 175 controls the amount of fuel injected ($m_f(k)$) into at least one cylinder of the engine 178. The objective of this nonlinear approach is to inject fuel into a cylinder of the engine 178 while simultaneously allowing the combustion phasing controller 160 to achieve the target combustion phasing ($\theta_{CA50}^{ref}(k)$) without violating predetermined constraints as discussed above. When implementing the nonlinear fuel governor of FIG. 5, the ECM 105 receives engine data (i.e., engine speed, cylinder pressures, temperatures, pedal position, and other) captured by the sensors and measurements of the combustion phasing ($\theta_{CA50}(k)$) and indicated mean effective pressure (IMEP) (step 195). The ECM 105 processes the received data and measurements, and determines a target fuel injection amount ($m_f^{des}(k)$) and current combustion state information ($\hat{x}(k)$) for a first combustion cycle (step 200). The ECM 105 then estimates the actuator settings required during a subsequent combustion cycle to approach the target combustion phasing ($\theta_{CA50}^{ref}(k)$) if the target fuel injection amount ($m_f^{des}(k)$) were to be injected during the first combustion cycle (step 205). The nonlinear fuel governor employs a simulated model of the closed loop engine system 100 with the amount of fuel injected ($m_f(k)$) given by $$m_f(k) = m_f(k-1) + \beta(m_f^{des}(k) - m_f(k-1)) \quad (7)$$

where $m_f^{des}(k)$ is the target fuel injection amount for the first combustion cycle, $m_f(k-1)$ is the amount of fuel injected during a previous combustion cycle, and $\beta$ is the adjustment parameter used in determining an attenuated fuel quantity ($m_f(k)$). The value of $\beta$ is initially set to 1 ("one").

If the actuator settings required during the subsequent combustion cycle to approach the target combustion phasing ($\theta_{CA50}^{ref}(k)$) are predicted to violate the predetermined constraints if the target fuel injection amount ($m_f^{des}(k)$) is injected during the first combustion cycle (step 210), then the attenuated fuel quantity ($m_f(k)$) is determined (steps 205-225) and injected during the first combustion cycle (step 230). If the actuator settings required during the subsequent combustion cycle to approach the target combustion phasing ($\theta_{CA50}^{ref}(k)$) are predicted to satisfy the predetermined constraints if the target fuel injection amount ($m_f^{des}(k)$) is injected during the first combustion cycle (step 210), then the target fuel injection amount ($m_f^{des}(k)$) is injected during the first combustion cycle (step 230).

If constraint violations are predicted (step 210), the ECM 105 reduces the value of the adjustment parameter ($\beta$) (step 215). Then, the ECM 105 determines a first adjusted fuel quantity based on the reduced adjustment parameter ($\beta$), the target fuel injection amount ($m_f^{des}(k)$), and the amount of fuel injected during the previous combustion cycle ($m_f(k-1)$), if such amount is known (step 205). The ECM 105 utilizes the predictive model of the nonlinear fuel governor to again determine the actuator settings required during the subsequent combustion cycle to approach the target combustion phasing ($\theta_{CA50}^{ref}(k)$) if the first adjusted fuel quantity is injected during the first combustion cycle (step 205). If the actuator settings required during the subsequent combustion cycle to approach the target combustion phasing ($\theta_{CA50}^{ref}(k)$) are still predicted to violate the predetermined actuator constraints if the first adjusted fuel quantity is injected during the first combustion cycle (step 210), then the adjustment parameter ($\beta$) is again reduced (step 215) and a second adjusted fuel quantity is determined based upon the reduced adjustment parameter ($\beta$) (step 205). This process is repeated until an adjusted fuel quantity is calculated that does not require a violation of the actuator constraints.

Once an adjusted fuel quantity is determined that satisfies the actuator constraint (step 210), the ECM 105 determines whether the value of the adjustment parameter ($\beta$) has converged toward an optimal value of $\beta$ between zero and one (step 220) as it was adjusted. If the adjustment parameter ($\beta$) has not converged (step 220), the ECM 105 increases the value of the adjustment parameter ($\beta$) (step 225) and again simulates the model to determine an adjusted fuel quantity (step 205). The adjustment parameter ($\beta$) has converged when a difference between a current value of the adjustment parameter $\beta(i)$ and a value of the adjustment parameter calculated during a previous iteration of the predictive model $\beta(i-1)$ is less than a predetermined tolerance ($\epsilon$).

$$|\beta(i) - \beta(i-1)| \leq \epsilon \quad (8)$$

Otherwise, the adjustment parameter ($\beta$) has not converged.

This process is repeated until the value of the adjustment parameter converges toward an optimal value which can be used to calculate a fuel injection quantity that does not lead to violations of the actuator constraints. In some embodiments, the repeated acts of reducing and increasing the value of the adjustment parameter ($\beta$) are performed according to a bisectional search between the values of zero and one.

Figure 6:
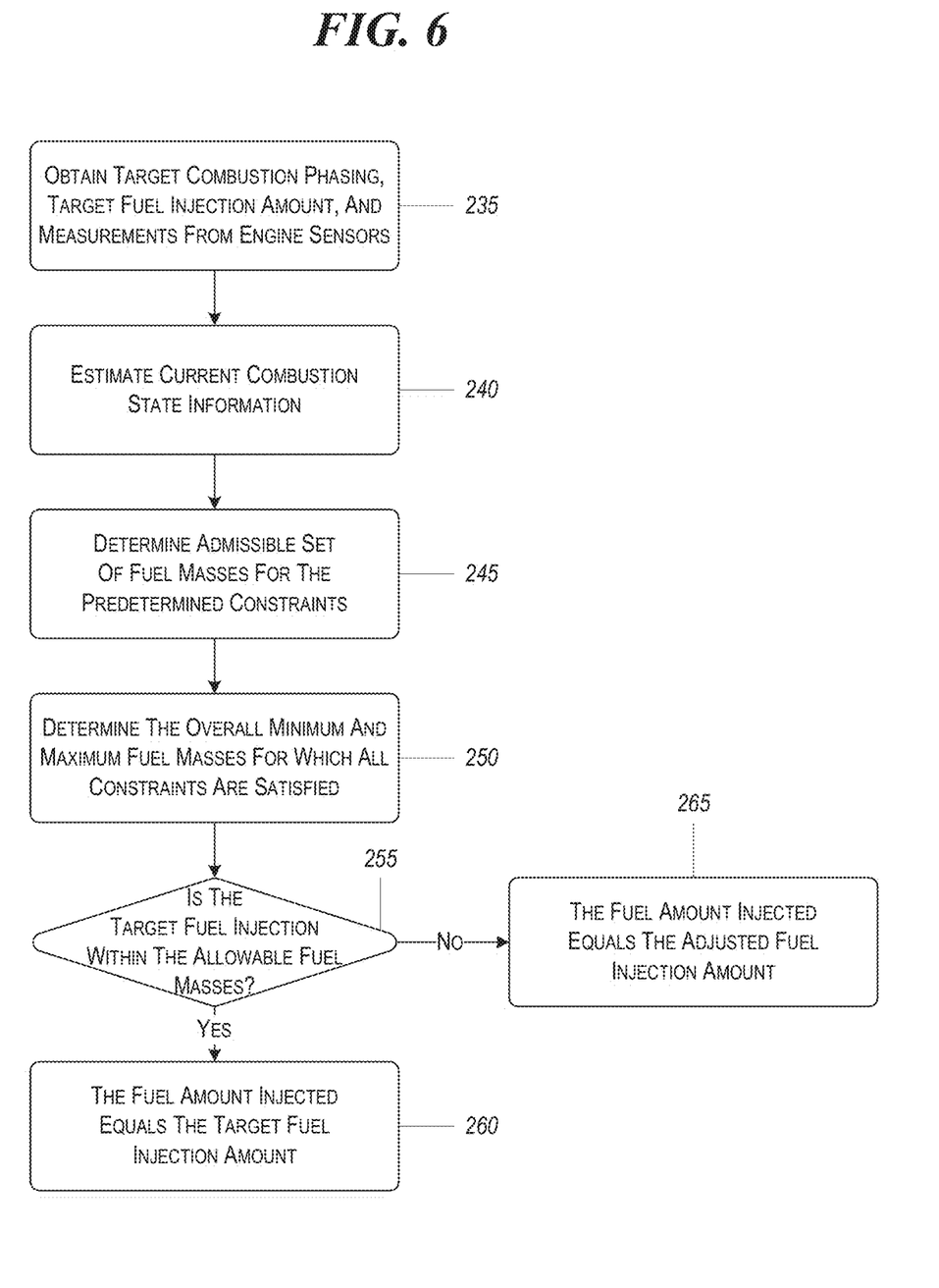
FIG. 6 is a flowchart of a linear method of operating the fuel governor of FIG. 3 to determine a fuel injection amount for an internal combustion engine.

FIG. 6 illustrates the operation of another example of a fuel governor 175. This example uses a linear method for determining if desired fuel injection amounts would violate the engine actuator constraints. When implemented as a linear system, the ECM 105 again receives and processes the engine data captured by the sensors, the engine output corresponding to the combustion phasing ($\theta_{CA50}(k)$), and the target values of combustion phasing ($\theta_{CA50}^{ref}(k)$) and fuel injection amount ($m_f^{des}(k)$) (step 235). The ECM 105 then uses the functionality of the observer 170 to estimate the current combustion state information ($\hat{x}(k)$) (step 240). Based on the estimated current combustion state information ($\hat{x}(k)$), the ECM 105 determines a range of permissible fuel amounts for each of the plurality of predetermined constraints to be satisfied (step 245).

For example, the range of permissible fuel amounts for an NVO saturation constraint, denoted by $S_{nvo}^{sat}(n)$, is given by $$S_{nvo}^{sat}(n) = [m_f^{min}(n), m_f^{max}(n)] \quad (9)$$

where $m_f^{min}(n)$ is the minimum fuel amount and $m_f^{max}(n)$ is the maximum fuel amount permissible for the NVO saturation constraint to be satisfied. An overall minimum fuel amount ($m_f^{min}$) and an overall maximum fuel amount ($m_f^{max}$) are determined (step 250) and defined by $$[m_f^{min}, m_f^{max}] = \overline{S_{nvo}^{sat}} \cap \overline{S_{nvo}^{rate}} \cap \overline{S_{soi}^{sat}} \quad (10)$$

the overlap between the range of permissible fuel amounts for the NVO saturation constraint ($S_{nvo}^{sat}(n)$), the range of permissible fuel amounts for an NVO rate constraint ($S_{nvo}^{rate}(n)$), and the range of permissible fuel amounts for an SOI saturation constraint ($S_{soi}^{sat}(n)$) for which all constraints will be satisfied.

As further illustrated in FIG. 6, if the target fuel injection amount ($m_f^{des}(k)$) is within the range defined by the overall minimum fuel amount ($m_f^{min}$) and the overall maximum fuel amount ($m_f^{max}$) (step 255), then the amount of fuel injected ($m_f(k)$) into at least one cylinder of the engine 178 equals the target fuel injection amount ($m_f^{des}(k)$) (step 260). If, however, the ECM 105 determines that the target fuel injection amount ($m_f^{des}(k)$) falls outside of the range of allowable fuel amounts (step 255), then the amount of fuel is adjusted before it is injected (step 265). The amount of fuel injected, denoted by ($m_f(k)$), is defined by $$m_f(k) = \begin{cases} m_f^{min} & \text{if } m_f^{des}(k) < m_f^{min} \\ m_f^{max} & \text{if } m_f^{des}(k) > m_f^{max} \\ m_f^{des}(k) & \text{otherwise} \end{cases} \quad (11)$$

where $m_f^{min}$ is the overall minimum fuel amount, $m_f^{max}$ is the overall maximum fuel amount, and $m_f^{des}(k)$ is the target fuel injection amount. As such, the amount of fuel to be injected ($m_f(k)$) is adjusted to equal the overall maximum fuel amount ($m_f^{max}$) when the target fuel injection amount $m_f^{des}(k)$ exceeds the overall maximum fuel injection amount ($m_f^{max}$). Conversely, the amount of fuel to be injected ($m_f(k)$) is adjusted to equal the overall minimum fuel amount ($m_f^{min}$) when the target fuel injection amount $m_f^{des}(k)$ is below the overall minimum fuel amount ($m_f^{min}$).

Thus, embodiments of the invention provide, among other things, methods and systems for controlling the performance of the engine during recompression HCCI combustion by adjusting the fuel amount injected into the engine when the fuel governor predicts that the target fuel injection amount would require actuator settings that violate the predetermined constraints.

Various features of the invention are set forth in the following claims.

What is claimed is:

1. A method for controlling combustion performance of an engine, the method comprising:
   determining a desired fuel quantity for a first combustion cycle;
   determining whether one or more engine actuator settings required during a subsequent combustion cycle to cause the engine to approach a target combustion phasing will be within a defined acceptable operating range if the desired fuel quantity is injected during the first combustion cycle;
   when the one or more engine actuator settings required during a subsequent combustion cycle to cause the engine to approach a target combustion phasing are predicted to be within the defined acceptable operating range if the desired fuel quantity is injected during the first combustion cycle, injecting the desired fuel quantity during the first combustion cycle; and
   when the one or more engine actuator settings required during a subsequent combustion cycle to cause the engine to approach a target combustion phasing are predicted to be outside the defined acceptable operating range if the desired fuel quantity is injected during the first combustion cycle,
   determining an attenuated fuel quantity, and
   injecting the attenuated fuel quantity during the first combustion cycle.

2. The method of claim 1, wherein determining an attenuated fuel quantity includes
   determining a first adjusted fuel quantity based on the desired fuel quantity,
   identifying the one or more engine actuator settings required during the subsequent combustion cycle to cause the engine to approach the target combustion phasing if the first adjusted fuel quantity is injected,
   determining whether the one or more engine actuator settings would be within the defined acceptable operating range if the first adjusted fuel quantity is injected during the first combustion cycle, and
   when the one or more engine actuator settings required during a subsequent combustion cycle to cause the engine to approach a target combustion phasing is predicted to be within the defined acceptable operating range if the first adjusted fuel quantity is injected during the first combustion cycle, defining the attenuated fuel quantity as the first adjusted fuel quantity.

3. The method of claim 2, wherein the act of determining a first adjusted fuel quantity based on the desired fuel quantity further includes determining a first adjusted fuel quantity based on the desired fuel quantity and the fuel quantity injected during a previous combustion cycle.

4. The method of claim 2, further comprising, when the one or more determined engine actuator settings required during a subsequent combustion cycle to cause the engine to approach the target combustion phasing is predicted to be outside the defined acceptable operating range if the first adjusted fuel quantity is injected during the first combustion cycle,
   determining a second adjusted fuel quantity based on the desired fuel quantity,
   identifying the one or more engine actuator settings required during the subsequent combustion cycle to cause the engine to approach the target combustion phasing if the second adjusted fuel quantity is injected,
   determining whether the one or more engine actuator settings would be within the defined acceptable operating range if the second adjusted fuel quantity is injected during the first combustion cycle, and
   when the one or more engine actuator settings required during the subsequent combustion cycle to approach the target combustion phasing is predicted to be within the defined acceptable operating range if the second adjusted fuel quantity is injected during the first combustion cycle, defining the attenuated fuel quantity as the second adjusted fuel quantity.

5. The method of claim 1, wherein determining an attenuated fuel quantity includes repeatedly adjusting the desired fuel quantity until the one or more engine actuator settings required during the subsequent combustion cycle to approach the target combustion phasing would be within the defined acceptable operating range if the adjusted fuel quantity is injected during the first combustion cycle.

6. The method of claim 5, wherein repeatedly adjusting the desired fuel quantity includes
   determining an adjusted fuel quantity based on an adjustment parameter, and
   repeatedly reducing the value of the adjustment parameter until the predictive model indicates that the one or more engine actuator settings required during the subsequent combustion cycle to cause the engine to approach the target combustion phasing would be within the defined acceptable operating range if the updated fuel quantity is injected during the first combustion cycle.

7. The method of claim 6, further comprising, when the one or more engine actuator settings required during the subsequent combustion cycle to cause the engine to approach the target combustion phasing would be within the defined acceptable operating range if the adjusted fuel quantity is injected,
   comparing a current value of the adjustment parameter to a value of the adjustment parameter calculated during an immediately prior iteration of the adjustment routine,
   when the difference between the current value of the adjustment parameter and the value of the adjustment parameter calculated during the immediately prior iteration is less than a threshold, defining the attenuated fuel quantity as the current value of the adjusted fuel quantity, and
   when the difference between the current value of the adjustment parameter and the value of the adjustment parameter calculated during the immediately prior iteration is greater than the threshold, increasing the value of the adjustment parameter.

8. The method of claim 7, wherein the acts of reducing the value of the adjustment parameter and increasing the value of the adjustment parameter are performed according to a bisectional search.

9. The method of claim 1, wherein the one or more actuator settings includes at least one of intake valve timing, exhaust valve timing, and injection timing.

10. The method of claim 9, wherein the defined acceptable operating range for the injection timing includes a range from a closing of an exhaust valve until an opening of an intake valve.

11. The method of claim 1, wherein the subsequent combustion cycle is a combustion cycle immediately following the first combustion cycle.

12. The method of claim 1, wherein the subsequent combustion cycle is a combustion cycle that occurs a number of combustion cycles after the first combustion cycle.

13. The method of claim 1, wherein the attenuated fuel quantity ($m_f(k)$) is defined as $$m_f(k)=m_f(k-1)+\beta(m_f^{des}(k)-m_f(k-1))$$

wherein $m_f(k-1)$ is an amount of fuel that was injected in a combustion cycle immediately before the first combustion cycle,
wherein $m_f^{des}(k)$ is a desired amount of fuel to be injected during the first combustion cycle, and
wherein $\beta$ is an adjustment parameter between zero and one.

14. The method of claim 13, wherein the adjustment parameter $\beta$ is determined based at least in part on the defined acceptable operating range of the one or more engine actuator settings.

15. The method of claim 1, further comprising:
   determining a maximum fuel injection amount, the maximum fuel injection amount being a maximum amount of fuel that can be injected into the engine without requiring one or more engine actuator settings that are outside of the defined acceptable operating range; and
   determining that the one or more engine actuator settings required during a subsequent combustion cycle to cause the engine to approach the target combustion phasing would be outside the defined acceptable operating range if the desired fuel quantity exceeds the maximum fuel injection amount.

16. The method of claim 15, wherein the act of determining an attenuated fuel quantity includes defining the attenuated fuel quantity as the maximum fuel injection amount when the desired fuel quantity exceeds the maximum fuel injection amount.

17. The method of claim 1, further comprising:
   determining a minimum fuel injection amount, the minimum fuel injection amount being a minimum amount of fuel that can be injected into the engine without requiring one or more engine actuator settings that are outside of the defined acceptable operating range; and
   determining that the one or more engine actuator settings required during a subsequent combustion cycle to cause the engine to approach the target combustion phasing would be outside the defined acceptable operating range if the desired fuel quantity does not exceed the minimum fuel injection amount.

18. The method of claim 15, wherein the act of determining an attenuated fuel quantity includes defining the attenuated fuel quantity as the minimum fuel injection amount when the desired fuel quantity does not exceed the minimum fuel injection amount.

* * * * *